(12) United States Patent
Marui et al.

(10) Patent No.: US 8,277,692 B2
(45) Date of Patent: Oct. 2, 2012

(54) SEMICONDUCTIVE RUBBER COMPOSITION AND SEMICONDUCTIVE RUBBER ROLLER EMPLOYING THE SAME

(75) Inventors: Takashi Marui, Kobe (JP); Yoshihisa Mizumoto, Kobe (JP); Kei Tajima, Kobe (JP); Noriaki Hitomi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 360 days.

(21) Appl. No.: 12/700,199

(22) Filed: Feb. 4, 2010

(65) Prior Publication Data

US 2010/0200814 A1    Aug. 12, 2010

(30) Foreign Application Priority Data

Feb. 6, 2009  (JP) ................. 2009-026324

(51) Int. Cl.
*H01B 1/24* (2006.01)
*G03G 15/02* (2006.01)
(52) U.S. Cl. .............. 252/511; 399/176; 399/286
(58) Field of Classification Search .......... 252/500, 252/511; 399/176, 279, 286
See application file for complete search history.

(56) References Cited

U.S. PATENT DOCUMENTS

| | | | | |
|---|---|---|---|---|
| 5,834,536 | A * | 11/1998 | Scholl | 523/211 |
| 8,023,869 | B2 * | 9/2011 | Mizumoto et al. | 399/286 |
| 2003/0096917 | A1 | 5/2003 | Hattori et al. | |
| 2004/0229967 | A1 | 11/2004 | Hattori et al. | |
| 2004/0230011 | A1 | 11/2004 | Hattori et al. | |
| 2005/0261468 | A1 | 11/2005 | Hattori et al. | |
| 2006/0284142 | A1 | 12/2006 | Mizumoto | |
| 2007/0243984 | A1 | 10/2007 | Mizumoto | |
| 2007/0254792 | A1 | 11/2007 | Mizumoto | |
| 2008/0107456 | A1 | 5/2008 | Mizumoto et al. | |
| 2008/0281027 | A1 | 11/2008 | Hattori et al. | |
| 2010/0222483 | A1 | 9/2010 | Hattori et al. | |

FOREIGN PATENT DOCUMENTS

| | | |
|---|---|---|
| JP | 2003-183494 A | 7/2003 |
| JP | 2003-213028 A | 7/2003 |
| JP | 2003-233229 A | 8/2003 |
| JP | 2003-270885 A | 9/2003 |
| JP | 2006-348245 A | 12/2006 |
| JP | 2007-286236 A | 11/2007 |
| JP | 2007-313883 A | 12/2007 |
| JP | 2008-116684 A | 5/2008 |

* cited by examiner

*Primary Examiner* — Mark Kopec
(74) *Attorney, Agent, or Firm* — Birch, Stewart, Kolasch & Birch, LLP

(57) ABSTRACT

The semiconductive rubber composition according to the present invention contains: a rubber content containing at least copolymer rubber containing ethylene oxide as a copolymeric component and chloroprene rubber; and not less than 0.5 parts by mass and not more than 1.5 parts by mass of a thiourea-based vulcanization accelerator, not less than 0.5 parts by mass and not more than 1.5 parts by mass of a guanidine-based vulcanization accelerator and not less than 0.5 parts by mass and not more than 2.0 parts by mass of a peroxide-based crosslinking agent with respect to 100 parts by mass of the sum of the rubber content.

6 Claims, 1 Drawing Sheet

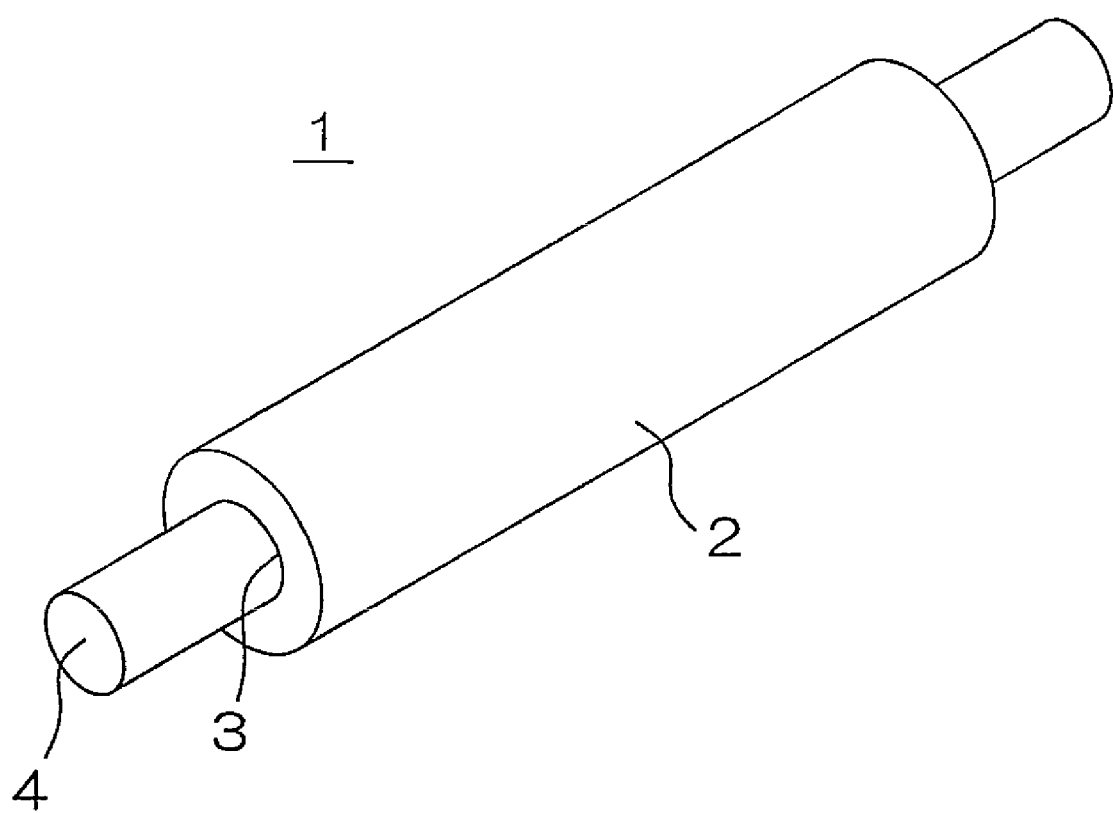

SEMICONDUCTIVE RUBBER COMPOSITION AND SEMICONDUCTIVE RUBBER ROLLER EMPLOYING THE SAME

BACKGROUND OF THE INVENTION

1. Field of the Invention

The present invention relates to a semiconductive rubber composition and a semiconductive rubber roller made of the semiconductive rubber composition to be assembled into an electrophotographic apparatus such as a laser printer.

2. Description of Related Art

An electrophotographic apparatus such as a laser printer, an electrostatic copier, a plain paper facsimile or a composite apparatus thereof has been widely spread with improvements in speed and picture quality, colorization and downsizing, for example. Such improvements are still in progress at the present time.

For example, the laser printer is in the process of research and development for downsizing aiming at further universalization and implementation of maintenance-free properties through improvements in durability of respective portions. With this stream, further downsizing and high durability are required also to rubber components such as a semiconductive rubber roller assembled into an image forming apparatus.

The semiconductive rubber roller is employed in the laser printer as a charging roller, a developing roller, a transfer roller or a cleaning roller, for example. The developing roller is employed for transporting a toner brought into contact with the surface of the developing roller at high pressure by a quantity regulating blade and charged in a developing section of the laser printer or the like to a surface of a photosensitive drum and developing an electrostatic latent image formed on the surface into a toner image.

In a general laser printer, the developing roller is detachably mounted on a casing of the laser printer as a cartridge integrated with the photosensitive drum and a toner container. If the toner stored in the toner container is used up, the developing roller and the photosensitive drum are also exchanged for new ones as the cartridge, so that the laser printer is maintenance-free.

In order to satisfy the recent requirement for further downsizing of the laser printer or to develop a miniature full-color laser printer, the cartridge must be more downsized than ever.

Therefore, the developing roller must be:

more reduced in diameter than ever;

reduced in hardness and increased in flexibility to be brought into contact with the surface of the photosensitive drum in a state maintaining a nip thickness equivalent to that of a conventional developing roller upon reduction in diameter; and prevented from the so-called "permanent set" through which the developing roller is hardly restored to the original state when released from the pressure contact with the photosensitive drum after deformation following the pressure contact by maintaining a state having small compression set upon reduction in hardness thereby preventing unevenness of imaging resulting from the permanent set.

More specifically, the developing roller must have hardness of not more than A60 in the type A durometer hardness defined in JIS (Japanese Industrial Standards) K6253:2006 "Rubber, vulcanized or thermoplastic—determination of hardness" and compression set of not more than 5% defined in JIS K6262:2006 "Rubber, vulcanized or thermoplastic determination of compression set at ambient, elevated or low temperatures". In this specification, the type A durometer hardness is expressed in a value measured in an environment having a temperature of 23±1° C. and relative humidity of 55±1%. Further, the compression set is expressed in a value measured at a temperature of 70±1° C. with compressibility of 25% for a measuring time of 22 hours.

When a cartridge having been warehoused is mounted on the laser printer for starting image formation or image formation is started or restarted from a state stopping the laser printer while the developing roller is in pressure contact with the surface of the photosensitive drum, for example, the permanent set is linearly caused on a portion of the outer peripheral surface of the developing roller having been in pressure contact with the surface of the photosensitive drum during the warehousing or the stoppage along a generatrix of a cylinder forming the outer peripheral surface of the roller.

If the developing roller is not immediately released from the permanent set upon starting or restarting of the image formation, a position of a formed image corresponding to the portion of the developing roller causing the permanent set is reduced in density, to result in striped unevenness of the density, i.e., unevenness of imaging in the formed image. Not only when the compression set is excessive but also when the hardness is excessive, the developing roller may not be immediately released from permanent set particularly in an initial stage upon starting or restarting of the image formation, to cause unevenness of imaging.

The semiconductive rubber roller such as the developing roller is made of a semiconductive rubber composition containing copolymer rubber containing ethylene oxide as a copolymeric component and exhibiting ion conductivity, for example. The copolymer rubber exhibiting ion conductivity can be prepared from epichlorohydrin-based copolymer rubber such as epichlorohydrin-ethylene oxide copolymer rubber or epichlorohydrin-ethylene oxide-allyl glycidyl ether copolymer rubber or polyether-based copolymer rubber such as ethylene oxide-allyl glycidyl ether copolymer rubber, ethylene oxide-propylene oxide copolymer rubber or ethylene oxide-propylene oxide-allyl glycidyl ether copolymer rubber, for example.

A semiconductive rubber roller is obtained by preparing a semiconductive rubber composition by blending chloroprene rubber (CR), acrylonitrile butadiene copolymer rubber (NBR) or the like into the copolymer rubber if necessary while adding additives such as a vulcanizer and a vulcanization accelerator, molding the semiconductive rubber composition into the form of a roller and thereafter vulcanizing the roller (refer to Patent Document 1: Japanese Unexamined Patent Publication No. 2008-116684, Patent Document 2: Japanese Unexamined Patent Publication No. 2007-313883 and Patent Document 3: Japanese Unexamined Patent Publication No. 2007-286236).

According to studies made by the inventor, however, it has been proven that each of semiconductive rubber rollers described in Patent Documents 1 to 3 easily causes permanent set due to large compression set when the hardness thereof is reduced in order to maintain a prescribed nip thickness upon reduction in diameter, and easily causes unevenness of imaging due to the permanent set when the semiconductive rubber roller is used as a developing roller for repeating image formation, for example.

SUMMARY OF THE INVENTION

An object of the present invention is to provide a semiconductive rubber composition capable of forming a semiconductive rubber roller or the like having small compression set in a state reduced in hardness and supplied with flexibility in order to maintain a prescribed nip thickness particularly when reduced in diameter and hardly causing permanent set and unevenness of imaging following thereto.

Another object of the present invention is to provide a semiconductive rubber roller prepared from the semiconductive rubber composition.

In order to solve the aforementioned problems, the inventor has examined components constituting the semiconductive rubber composition employed as the material for the conventional semiconductive rubber roller. As a result, it has been recognized that each of the conventional semiconductive rubber compositions contains a vulcanizer prepared by the single use of sulfur or the combined use of sulfur and thiourea, and the compression set is increased upon reduction in hardness to easily cause permanent set and unevenness of imaging following thereto when the vulcanizer is composed of sulfur and/or thiourea.

The inventor has made further studies, to find out that a semiconductive rubber roller hardly causing permanent set and following unevenness of imaging due to low hardness, high flexibility and small compression set by selectively combining a thiourea-based vulcanization accelerator, a guanidine-based vulcanization accelerator and a peroxide-based crosslinking agent, whose effects have not been verified in practice although the same are individually illustrated as vulcanization accelerators and a vulcanizer in the Patent Documents 1 to 3 etc., at specific ratios respectively and causing vulcanization in a system employing both copolymer rubber containing ethylene oxide as a copolymeric component and chloroprene, and completed the present invention.

In other words, the present invention provides a semiconductive rubber composition containing: a rubber content containing at least copolymer rubber containing ethylene oxide as a copolymeric component and chloroprene rubber; and not less than 0.5 parts by mass and not more than 1.5 parts by mass of a thiourea-based vulcanization accelerator, not less than 0.5 parts by mass and not more than 1.5 parts by mass of a guanidine-based vulcanization accelerator and not less than 0.5 parts by mass and not more than 2.0 parts by mass of a peroxide-based crosslinking agent with respect to 100 parts by mass of the sum of the rubber content.

Preferably, the copolymer rubber is at least one type selected from the group consisting of epichlorohydrin-ethylene oxide copolymer rubber and epichlorohydrin-ethyleneoxide-allyl glycidyl ether copolymer rubber. The rubber content may contain NBR.

The present invention also provides a semiconductive rubber roller made of the semiconductive rubber composition according to the present invention, which is excellent in the aforementioned characteristics.

According to the present invention, a semiconductive rubber composition capable of forming a semiconductive rubber roller or the like having small compression set in a state reduced in hardness and supplied with flexibility in order to maintain a prescribed nip thickness particularly when reduced in diameter and hardly causing permanent set and unevenness of imaging following thereto and a semiconductive rubber roller excellent in the aforementioned characteristics can be provided.

The foregoing and other objects, features and effects of the present invention will become more apparent from the following detailed description of the embodiments with reference to the attached drawings.

BRIEF DESCRIPTION OF THE DRAWINGS

FIG. 1 is a perspective view showing an embodiment of a sheet feed roller according to the present invention.

DESCRIPTION OF EMBODIMENTS (Semiconductive Rubber Composition)
A semiconductive rubber composition according to the present invention contains:
 a rubber content containing at least copolymer rubber (may hereinafter be referred to as "ethylene oxide-containing copolymer rubber") containing ethylene oxide as a copolymeric component and chloroprene rubber; and
 not less than 0.5 parts by mass and not more than 1.5 parts by mass of a thiourea-based vulcanization accelerator, not less than 0.5 parts by mass and not more than 1.5 parts by mass of a guanidine-based vulcanization accelerator and not less than 0.5 parts by mass and not more than 2.0 parts by mass of a peroxide-based crosslinking agent with respect to 100 parts by mass of the sum of the rubber content.

The ethylene oxide-containing copolymer rubber can be prepared from one or more types of copolymer rubber containing ethylene oxide as a copolymeric component and exhibiting ion conductivity, such as epichlorohydrin-ethylene oxide copolymer rubber, epichlorohydrin-ethylene oxide-allyl glycidyl ether copolymer rubber, ethylene oxide-allyl glycidyl ether copolymer rubber, ethylene oxide-propylene oxide copolymer rubber and ethylene oxide-propylene oxide-allyl glycidyl ether copolymer rubber, for example.

In particular, at least one type selected from the group consisting of epichlorohydrin-ethylene oxide copolymer rubber and epichlorohydrin-ethylene oxide-allyl glycidyl ether copolymer rubber is preferable.

Ethylene oxide functions to reduce the volume specific resistance of a semiconductive rubber roller by stabilizing a large quantity of ions. If the quantity of ethylene oxide is excessive, however, the ethylene oxide is crystallized to hinder segmental motion of molecular chains, and hence the volume specific resistance of the semiconductor rubber roller contrarily tends to increase. If the quantity of ethylene oxide is excessive, further, the hardness of the semiconductive rubber roller may increase, or the viscosity of the semiconductor rubber composition not yet vulcanized may increase to reduce moldability.

In the epichlorohydrin-ethylene oxide copolymer rubber, therefore, the ethylene oxide content is preferably not less than 30 mole percent and not more than 80 mole percent, particularly preferably not less than 50 mole percent and not more than 80 mole percent.

Allyl glycidyl ether itself functions to ensure a free volume as a side chain, thereby suppressing crystallization of ethylene oxide and reducing the volume specific resistance of the semiconductive rubber roller. If allyl glycidyl ether is excessively present, however, not only no further effect is attained but the number of crosslinking points after vulcanization is increased, and hence the volume specific resistance of the semiconductive rubber roller rather tends to increase. Further, the tensile strength, the fatigue characteristics, the flex resistance etc. of the semiconductive rubber roller may be reduced.

When the ethylene oxide content is in the same range as the epichlorohydrin-ethylene oxide copolymer rubber in the epichlorohydrin-ethylene oxide-allyl glycidyl ether copolymer rubber, therefore, the allyl glycidyl ether content is preferably not less than 0.5 mole percent and not more than 10.5 mole percent, particularly preferably not less than 2 mole percent and not more than 6 mole percent.

Chloroprene rubber contains a large quantity of chlorine atoms. Therefore, when a semiconductive rubber roller prepared from the semiconductive rubber composition containing the chloroprene rubber is used as a developing roller, for example, a positively charged toner can be easily and efficiently charged. When assembled into a laser printer employing a positively charged toner as a developing roller, therefore, the semiconductive rubber roller can exert excellent electrostatic characteristics.

Chloroprene rubber, synthesized by emulsion-polymerizing chloroprene, is classified into a sulfur-modified type and a non-sulfur-modified type in response to the type of a molecular weight modifier employed for the emulsion polymerization. Sulfur-modified chloroprene rubber is obtained by plasticizing a polymer prepared by copolymerizing chloroprene and sulfur serving as a molecular weight modifier with thiuram disulfide or the like and preparing the polymer in prescribed viscosity.

Non-sulfur-modified chloroprene rubber is classified into a mercaptan-modified type, a xanthogen-modified type etc. Mercaptan-modified chloroprene rubber is synthesized similarly to the above by employing alkyl mercaptan such as n-dodecyl mercaptan, tert-dodecyl mercaptan or octyl mercaptan as a molecular weight modifier. Xanthogen-modified chloroprene rubber is synthesized similarly to the above by employing an alkyl xanthogen compound as a molecular weight modifier.

Further, chloroprene rubber is classified into a type crystallized at a low rate, that crystallized at an intermediate rate and that crystallized at a high rate on the basis of the crystallization rate thereof. While any type of chloroprene rubber may be employed in the present invention, non-sulfur-modified chloroprene rubber crystallized at a low rate is particularly preferable.

Chloroprene rubber may be prepared from a copolymer of chloroprene and another copolymeric component. The other copolymeric component can be prepared from one or more of 2,3-dichloro-1,3-butadiene, 1-chloro-1,3-butadiene, styrene, acrylonitrile, methacrylonitrile, isoprene, butadiene, acrylic acid, acrylic ester, methacrylic acid and methacrylic acid ester, for example.

When both of the ethylene oxide-containing copolymer rubber and chloroprene rubber are employed as the rubber content, the mass ratio (ethylene oxide-containing copolymer rubber)/(chloroprene rubber) between the ethylene oxide-containing copolymer rubber and the chloroprene rubber is preferably 30/70 to 70/30, particularly preferably 40/60 to 60/40. If the ratio of chloroprene rubber is below this range, the aforementioned effect of easily and efficiently charging the positively charged toner may be insufficient.

If the ratio of chloroprene rubber exceeds the aforementioned range, on the other hand, the ratio of the ethylene oxide-containing copolymer rubber is relatively reduced to reduce the conductivity of the semiconductive rubber roller, and hence the effect of easily and efficiently charging the positively charged toner may be rather insufficient.

The rubber content may contain NBR. When NBR and chloroprene rubber are mixed with each other and ethylene oxide-containing copolymer rubber is mixed into the mixture in which the chloroprene rubber is finely dispersed, the NBR and the chloroprene rubber are extremely finely dispersed despite different functional groups thereof. As a result of fine dispersion of the three materials, therefore, the semiconductive rubber roller can be reduced in hardness, increased in flexibility, improved in extensibility and reduced in compression set. Further, the hardness of the semiconductive rubber roller can be maintained in a prescribed range over a wide temperature range by reducing temperature dependence of the hardness. In addition, the weight of the semiconductive rubber roller can be reduced by reducing the specific gravity thereof, and the wear resistance of the semiconductive rubber roller can also be improved due to the reduction in weight and the improvement in flexibility and extensibility.

The NBR may be prepared from any one of low-nitrile NBR having an acrylonitrile content of not more than 24%, intermediate-nitrile NBR having an acrylonitrile content of 25 to 30%, moderate-nitrile NBR having an acrylonitrile content of 31 to 35%, high-nitrile NBR having an acrylonitrile content of 36 to 42% and extremely high-nitrile NBR having an acrylonitrile content of not less than 43%. The weight of the semiconductive rubber roller can be reduced by reducing the specific gravity thereof particularly when low-nitrile NBR having small specific gravity is employed.

When ethylene oxide-containing copolymer rubber, chloroprene rubber and NBR are employed as the rubber content, the mass ratio (ethylene oxide-containing copolymer rubber)/(chloroprene rubber+NBR) between the ethylene oxide-containing rubber and the sum of the chloprene rubber and the NBR is preferably 30/70 to 70/30, particularly preferably 40/60 to 60/40. Further, the mass ratio (chloroprene rubber)/(NBR) between the chloroprene rubber and the NBR is preferably 30/70 to 70/30, particularly preferably 40/60 to 60/40.

If the ratio of NBR is below this range, the aforementioned effects of improving the hardness of the semiconductive rubber roller, improving the flexibility and the extensibility thereof and reducing the compression set by introducing the NBR may be insufficient.

If the ratio of NBR exceeds the aforementioned range, on the other hand, the ratio of chloroprene rubber is relatively reduced due to charging polarity of the NBR reverse to that of the chloroprene rubber, and the aforementioned effect of easily and efficiently charging the positively charged toner may be insufficient.

The thiourea-based vulcanization accelerator and the guanidine-based vulcanization accelerator are employed as vulcanization accelerators. The thiourea-based vulcanization accelerator can be prepared from one or more of N,N'-diphenylthiourea, N,N'-diethylthiourea, dibutylthiourea, dilaurylthiourea, trimethylthiourea and ethylene thiourea (2-mercaptoimidazoline), for example. In particular, 2-mercaptoimidazoline is preferable.

The content of the thiourea-based vulcanization accelerator must be not more than 0.5 parts by mass and not less than 1.5 parts by mass with respect to the sum of 100 parts by mass of the rubber content. If the content of the thiourea-based vulcanization accelerator is less than 0.5 parts by mass, the rubber content is insufficiently vulcanized and compression set of the semiconductive rubber roller is excessively increased, to result in permanent set and unevenness of imaging following thereto. Further, a photosensitive drum is contaminated. In other words, the number of crosslinking points of rubber molecules is so reduced and chains thereof are so coarsened that a low-molecular-weight rubber content or the like is easily deposited on the surface of the semiconductive rubber roller and the deposited rubber content or the like is transferred to the surface of the photosensitive drum and adheres thereto, to reduce the quality of a formed image.

If the content of the thiourea-based vulcanization accelerator exceeds 1.5 parts by mass, on the other hand, the rubber content is excessively vulcanized and the semiconductive rubber roller is excessively hardened, to result in permanent set and unevenness of imaging following thereto. Further, the photosensitive drum is contaminated. In other words, a reaction residue of the excessively added thiourea-based vulcanization accelerator or an unreacted thiourea-based vulcanization accelerator is deposited on the surface of the semiconductive rubber, transferred to the surface of the photosensitive drum and adheres to the surface or reacts with a photosensitive material or the like constituting a photosensitive layer provided on the surface to reduce the quality of the formed image.

In order to form a semiconductive rubber roller properly adjusted in compression set and hardness to hardly cause permanent set and unevenness of imaging following thereto by more effectively suppressing arising of the aforementioned problems, the content of the thiourea-based vulcanization accelerator is preferably not less than 0.8 parts by mass and not more than 1.2 parts by mass, particularly preferably around 1.0 part by mass in the aforementioned range.

The guanidine-based vulcanization accelerator can be prepared from one or more of 1,3-diphenylguanidine, di-o-tolylguanidine, 1-o-tolylbiguanide and di-o-tolylguanidine salt of dicatechol borate, for example. In particular, di-o-tolylguanidine is preferable.

The content of the guanidine-based vulcanization accelerator must be not less than 0.5 parts by mass and not more than 1.5 parts by mass with respect to the sum of 100 parts by mass of the rubber content. If the content of the guanidine-based vulcanization accelerator is less than 0.5 parts by mass, the rubber content is insufficiently vulcanized and compression set of the semiconductive rubber roller is excessively increased, to result in permanent set and unevenness of imaging following thereto. Further, the photosensitive drum is contaminated. In other words, the number of crosslinking points of rubber molecules is so reduced and chains thereof are so coarsened that a low-molecular-weight rubber content or the like is easily deposited on the surface of the semiconductive rubber roller and the deposited rubber content or the like is transferred to the surface of the photosensitive drum and adheres thereto, to reduce the quality of a formed image.

If the content of the guanidine-based vulcanization accelerator exceeds 1.5 parts by mass, on the other hand, the rubber content is excessively vulcanized and the semiconductive rubber roller is excessively hardened, to result in permanent set and unevenness of imaging following thereto. Further, the photosensitive drum is contaminated. In other words, a reaction residue of the excessively added guanidine-based vulcanization accelerator or an unreacted guanidine-based vulcanization accelerator is deposited on the surface of the semiconductive rubber, transferred to the surface of the photosensitive drum and adheres to the surface or reacts with the photosensitive material or the like constituting the photosensitive layer provided on the surface to reduce the quality of the formed image. In particular, the guanidine-based vulcanization accelerator is more easily deposited than other vulcanization accelerators.

In order to form a semiconductive rubber roller properly adjusted in compression set and hardness to hardly cause permanent set and unevenness of imaging following thereto by more effectively suppressing arising of the aforementioned problems, the content of the guanidine-based vulcanization accelerator is preferably not less than 0.8 parts by mass and not more than 1.2 parts by mass, particularly preferably around 1.0 part by mass in the aforementioned range.

The peroxide-based crosslinking agent is employed as a vulcanizer. The peroxide-based crosslinking agent can be prepared from one or more of ketone peroxides, diacyl peroxides, hydroperoxides and dialkyl peroxides, for example.

Alkyl peroxides include di-t-butyl peroxide, t-butyl-α-cumyl peroxide, di-α-cumyl peroxide, 1,3-bis[(t-butyl peroxy)isopropyl]benzene, 1,4-bis[(t-butyl peroxy) isopropyl] benzene, 1,1-bis (t-butyl peroxy)cyclohexane, 2,5-dimethyl-2,5-bis(t-butyl peroxy)hexane and 2,5-dimethyl-2,5-bis(t-butyl peroxy)-3-hexine, for example, and di-α-cumyl peroxide is particularly preferable.

The content of the peroxide-based crosslinking agent must be not more than 0.5 parts by mass and not less than 2.0 parts by mass with respect to the sum of 100 parts by mass of the rubber content. If the content of the peroxide-based crosslinking agent is less than 0.5 parts by mass, the rubber content is insufficiently vulcanized and compression set of the semiconductive rubber roller is excessively increased, to result in permanent set and unevenness of imaging following thereto. Further, the photosensitive drum is contaminated. In other words, the number of crosslinking points of rubber molecules is so reduced and chains thereof are so coarsened that a low-molecular-weight rubber content or the like is easily deposited on the surface of the semiconductive rubber roller and the deposited rubber content or the like is transferred to the surface of the photosensitive drum and adheres thereto, to reduce the quality of a formed image.

If the content of the peroxide-based crosslinking agent exceeds 2.0 parts by mass, on the other hand, the rubber content is excessively vulcanized and the semiconductive rubber roller is excessively hardened, to result in permanent set and unevenness of imaging following thereto. Further, the photosensitive drum is contaminated. In other words, the excessively added peroxide-based crosslinking agent is deposited on the surface of the semiconductive rubber as crystals, transferred to the surface of the photosensitive drum and adheres to the surface or oxidizes/deteriorates the photosensitive layer provided on the surface to reduce the quality of the formed image.

In order to form a semiconductive rubber roller properly adjusted in compression set and hardness to hardly cause permanent set and unevenness of imaging following thereto by more effectively suppressing arising of the aforementioned problems, the content of the peroxide-based crosslinking agent is preferably not less than 0.8 parts by mass and not more than 1.2 parts by mass, particularly preferably around 1.0 part by mass in the aforementioned range.

In addition to the aforementioned components, the semiconductive rubber composition according to the present invention may further contain additives such as a vulcanization assistant, a plasticizer, a processing aid, a filler, an acid acceptor, a dielectric loss tangent adjuster, an age resistor, an antioxidant, an antiscorching agent, an ultraviolet absorber, a lubricant, a pigment, a flame retardant material, a neutralizer and an antifoaming agent in proper ratios, if necessary.

The vulcanization assistant can be selected from various types of well-known vulcanization assistants including a metal oxide such as zinc oxide and fatty acid such as stearic acid, oleic acid or cottonseed fatty acid. The plasticizer can be prepared from dibutyl phthalate, dioctyl phthalate or tricresyl phosphate or wax, and the processing aid can be prepared from fatty acid such as stearic acid.

The filler can be prepared from silica, carbon, carbon black, clay, talc, calcium carbonate, magnesium carbonate, aluminum hydroxide or alumina. The antiscorching agent can be prepared from N-cyclohexylthiophthalimide, phthalic anhydride, N-nitrosodiphenylamine or 2,4-diphenyl-4-methyl-1-pentene.

The acid acceptor functions to prevent remaining of chlorine-based gas generated from halogen-based rubber, i.e., epichlorohydrin-ethylene oxide copolymer rubber, epichlorohydrin-ethylene oxide-allyl glycidyl ether copolymer rubber or chloroprene rubber and contamination of the photosensitive drum with the chlorine-based gas in vulcanization of the semiconductive rubber composition. The acid acceptor is preferably prepared from hydrotalcite excellent in dispersibility into rubber.

The dielectric loss tangent adjuster is added in order to adjust the dielectric loss tangent of the semiconductive rubber roller in a prescribed range particularly when the semiconductive rubber roller is used as a developing roller. The dielectric loss tangent is an index of feedability (conductivity) of electricity and the degree of influence by a capacitor component (capacitance) as well as a parameter indicating a phase lag upon application of alternating current, and indicates the magnitude of the capacitor component ratio upon voltage application. The dielectric loss tangent is expressed by the quantity of charges generated when a toner is brought into contact with the developing roller at high pressure by a quantity regulating blade in a developing section of a laser printer or the like and the quantity of charges escaping to the developing roller before the toner adhering to the outer peripheral surface of the developing roller is transported to the surface of the photosensitive drum, and serves as an index indicating the quantity of charges of the toner immediately before coming into contact with the photosensitive drum.

With a large dielectric loss tangent, the developing roller easily conducts electricity (charges) and is hardly polarized. With a small dielectric loss tangent, on the other hand, the developing roller hardly conducts electricity (charges) and is easily polarized. Therefore, the developing roller exhibits higher capacitance characteristics and can unescapably maintain charges on the toner resulting from frictional electrification with a small dielectric loss tangent. In other words, the developing roller can add chargeability to the toner and maintain the added chargeability. The dielectric loss tangent adjuster may be added in order to attain such effects. The dielectric loss tangent adjuster can be prepared from spherical or quasi-spherical weak-conductive carbon black having an average primary particle diameter of 100 to 250 nm or calcium carbonate treated with fatty acid.

(Semiconductive Rubber Roller)

FIG. 1 is a perspective view showing an embodiment of a semiconductive rubber roller according to the present invention.

Referring to FIG. 1, a semiconductive rubber roller 1 according to the embodiment includes a cylindrical roller body 2 made of the semiconductive rubber composition according to the present invention and a shaft 4 inserted into a through-hole 3 at the center of the roller body 2. The shaft 4 is integrally formed by a metal such as aluminum, an aluminum alloy or stainless steel, for example. The roller body 2 and the shaft 4 are electrically bonded and mechanically fixed to each other with a conductive adhesive or the like, for example, and integrally rotated.

The thickness of the roller body 2, not particularly restricted, is preferably not less than 0.5 mm and not more than 20 mm, more preferably not less than 1 mm and not more than 15 mm, particularly preferably not less than 4 mm and not more than 15 mm when the semiconductive rubber roller 1 is used as a developing roller of a laser printer or the like, for example, in order to ensure a proper nip thickness while reducing the size and the weight of the developing roller.

The roller body 2 is prepared from the semiconductive rubber composition according to the present invention similarly to the prior art. In other words, the semiconductive rubber composition is kneaded, heated and melted with an extrusion molding machine, extruded into an elongated cylinder through a die corresponding to the sectional shape of the roller body 2, i.e., an annular shape, cooled, solidified and thereafter cut into a prescribed length, and heated to be vulcanized in a steam pan while a tentative shaft for vulcanization is inserted into the through-hole 3.

Then, the roller body 2 is remounted on the shaft 4 coated with a conductive adhesive on the outer peripheral surface thereof. If the adhesive is a thermosetting adhesive, the thermosetting adhesive is hardened by heating, for electrically bonding and mechanically fixing the roller body 2 and the shaft 4 to each other. Then, the outer peripheral surface of the obtained substance is polished to prescribed surface roughness, if necessary. Thus, the semiconductive rubber roller 1 shown in FIG. 1 is manufactured.

The roller body 2 may have a two-layer structure including an outer layer on the side of the outer peripheral surface and an inner layer on the side of the shaft 4. In this case, at least the outer layer may be made of the semiconductive rubber composition according to the present invention.

If the semiconductive rubber roller 1 is used as a developing roller, seal portions for preventing toner leakage may be provided on both ends of the roller body 2 in the axial direction. The seal portions are prepared from nonwoven fabric or a sheet of fluororesin, for example, in the form of discs or the like greater in outer diameter than the roller body 2.

When an oxide film is formed on the surface of the roller body 2, the oxide film functions as a dielectric layer and the dielectric loss tangent of the semiconductive rubber roller 1 can be reduced. In the case of the developing roller, the oxide film serves as a low-friction layer to easily release the toner, whereby an image can be easily formed and a more excellent image is obtained as a result.

The oxide film preferably has a large number of C=O groups or C—O groups. The oxide film is formed by performing treatment such as ultraviolet irradiation and/or ozone irradiation on the surface of the roller body 2, thereby oxidizing a surface layer portion of the roller body 2. In particular, the oxide film is preferably formed by ultraviolet irradiation, in consideration of a short treatment time and a low cost.

In the semiconductive rubber roller 1 according to the present invention manufactured in the aforementioned manner, the type A durometer hardness of the roller body 2 is preferably not more than A60, as hereinabove described. When the type A durometer hardness of the roller body 2 is set to not more than A60, a prescribed nip thickness can be maintained when the roller body 2 is supplied with proper flexibility and reduced in diameter.

Further, the roller body 2 can be prevented from excessive hardness, so that the same can be prevented from permanent set causing unevenness of a formed image when image formation is started or restarted from a state stopping a laser printer while the semiconductive rubber roller 1 is in pressure contact with the surface of a photosensitive drum, for example.

In order to further improve the aforementioned effects, the type A durometer hardness of the roller body 2 is preferably not less than A40 and not more than A60, particularly preferably not less than A45 and not more than A55 in the aforementioned range. The type A durometer hardness is measured at a temperature of $23 \pm 1°$ C. with relative humidity of $55 \pm 1\%$, as hereinabove described.

The compression set of the roller body 2 is preferably not more than 5%. When the compression set of the roller body 2 is set to not more than 5%, the flexible roller body 2 can be prevented from permanent set causing unevenness of the formed image when image formation is started or restarted after the laser printer is stopped while the roller body 2 is in pressure contact with the surface of the photosensitive drum.

In order to further improve the effect, the compression set of the roller body 2 is preferably not more than 3% in the aforementioned range. The lower limit of the compression set is not particularly restricted. While the roller body 2 ideally causes absolutely no compression set, i.e., the compression set is ideally 0%, the roller body 2 is sufficiently effective if the compression set thereof is in the aforementioned range. The compression set is measured at a temperature of 70±1° C. with compressibility of 25% for a measuring time of 22 hours, also as hereinabove described.

In the roller body 2, electrical resistance under applied voltage of 100 V, measured at a temperature of 23±1° C. with relative humidity of 55±1%, is preferably not less than $10^3$ Ω and not more than $10^9$ Ω. When the electrical resistance is set to not less than $10^3$ Ω, discharge to the photosensitive drum can be prevented by controlling the current flowing in the roller body 2 and suppressing formation of a defective image.

When the electrical resistance is set to not more than $10^9$ Ω, on the other hand, the efficiency of toner supply or the like can be maintained when the semiconductive rubber roller 1 is used as a developing roller, for example, and the developing roller can be prevented from causing a voltage drop when the toner is transferred to the surface of the photosensitive drum and causing a defective image due to unreliable transportation of the toner from the developing roller to the photosensitive drum.

In order to further improve the aforementioned effects, the electrical resistance under the aforementioned conditions is more preferably not less than $10^5$ Ω and not more than $10^7$ Ω in the aforementioned range in the case of the developing roller.

In the roller body 2, a dielectric loss tangent upon application of alternating voltage of 5 V at a frequency of 100 Hz is preferably 0.1 to 1.8 if the semiconductive rubber roller 1 is used as the developing roller.

When the dielectric loss tangent is set to not more than 1.8, capacitor characteristics of the semiconductive rubber roller 1 can be improved for unescapably maintaining charges on the toner resulting from frictional electrification. In other words, chargeability can be added to the toner, and the added chargeability can be maintained.

When the dielectric loss tangent is set to not less than 0.1, on the other hand, reduction of a print density resulting from an excessive quantity of charges can be prevented, or the roller body 2 can be prevented from excessive hardness resulting from an excessive content of the dielectric loss tangent adjustor.

In order to further improve the effects, the dielectric loss tangent is more preferably not less than 0.3 and not more than 1.0, particularly preferably not less than 0.5 and not more than 0.8 in the aforementioned range.

In order to adjust the type A durometer hardness, the compression set and the electrical resistance of the roller body 2 in the aforementioned ranges, the content of ethylene oxide or another copolymeric component in the ethylene oxide-containing copolymer rubber for preparing the roller body 2, the compounding ratios of the ethylene oxide-containing copolymer rubber, chloroprene rubber and NBR, the compounding ratios of the two types of vulcanization accelerators and the peroxide-based crosslinking agent etc. may be properly adjusted in the aforementioned ranges.

In order to adjust the dielectric loss tangent in the aforementioned range, the content of the dielectric loss tangent adjuster, the thickness of the oxide film formed on the surface of the roller body 2 etc. may be adjusted.

In addition to the aforementioned developing roller, the semiconductive rubber roller 1 according to the present invention can be employed as a charging roller, a transfer roller or a cleaning roller for an electrophotographic apparatus such as a laser printer, an electrostatic copier, a plain paper facsimile or a composite apparatus thereof, for example. Further, the semiconductive rubber composition according to the present invention can be employed as the material for a semiconductive rubber blade or a semiconductive rubber belt assembled into the electrophotographic apparatus, in addition to the semiconductive rubber roller.

EXAMPLES

Example 1

In Example 1, a semiconductive rubber composition was prepared by employing 50 parts by mass of epichlorohydrin-ethylene oxide copolymer rubber [ECO, Epichromer (registered trademark) D by Daiso Co., Ltd.] as copolymer rubber containing ethylene oxide as a copolymeric component and 50 parts by weight of chloroprene rubber [CR, Shoprene (registered trademark) WRT by Showa Denko, K.K.] as rubber contents, blending 1.0 part by mass of a thiourea-based vulcanization accelerator [2-mercaptoimidazoline, Axel (registered trademark) 22-S by Kawaguchi Chemical Industry Co., Ltd.], 1.0 part by mass of a guanidine-based vulcanization accelerator [1,3-di-o-tolylguanidine, Nocceler (registered trademark) DT by Ouchi Shinko Chemical Industrial] and 1.0 part by mass of a peroxide-based crosslinking agent [di-α-cumyl peroxide, Percumyl (registered trademark) D by Nippon Oil and Fats Co., Ltd.] with respect to 100 parts by mass of the rubber contents in total and kneading the materials in a Banbury mixer.

The semiconductive rubber composition was fed to an extruder and extrusion-molded into a cylinder of φ22 mm in outer diameter and φ9 to 9.5 mm in inner diameter, thereafter mounted on a vulcanization shaft of φ8 mm in outer diameter and vulcanized in a steam pan at 160° C. for one hour Then, the cylinder was remounted on a shaft of φ10 mm in outer diameter coated with a conductive thermosetting adhesive on the outer peripheral surface and heated to 160° C. in an oven to be bonded thereto. Thereafter both ends of the cylinder were cut and the outer peripheral surface thereof was traverse-ground with a cylindrical grinder and thereafter mirror-finished so that the ten point height $Rz_{JIS94}$ of irregularities was 3 to 5 μm, thereby manufacturing a semiconductive rubber roller having a roller body of φ20 mm (tolerance: 0.05) in outer diameter.

Examples 2 and 3 and Comparative Examples 1 and 2

In each of Examples 2 and 3 and comparative examples 1 and 2, a semiconductive rubber roller was manufactured by preparing a semiconductive rubber composition similarly to Example 1, except that the content of a thiourea-based vulcanization accelerator with respect to 100 parts by mass of rubber contents in total was set to 0.4 parts by mass (comparative example 1), 0.5 parts by mass (Example 2), 1.5 parts by mass (Example 3) or 1.6 parts by mass (comparative example 2).

Examples 4 and 5 and Comparative Examples 3 and 4

In each of Examples 4 and 5 and comparative examples 3 and 4, a semiconductive rubber roller was manufactured by preparing a semiconductive rubber composition similarly to Example 1, except that the content of a guanidine-based vulcanization accelerator with respect to 100 parts by mass of rubber contents in total was set to 0.4 parts by mass (comparative example 3), 0.5 parts by mass (Example 4), 1.5 parts by mass (Example 5) or 1.6 parts by mass (comparative example 4).

Examples 6 and 7 and Comparative Examples 5 and 6

In each of Examples 6 and 7 and comparative examples 5 and 6, a semiconductive rubber roller was manufactured by preparing a semiconductive rubber composition similarly to Example 1, except that the content of a peroxide-based crosslinking agent with respect to 100 parts by mass of rubber contents in total was set to 0.4 parts by mass (comparative example 5), 0.5 parts by mass (Example 6), 2.0 parts by mass (Example 7) or 2.1 parts by mass (comparative example 6).

Example 8

In Example 8, a semiconductive rubber roller was manufactured by preparing a semiconductive rubber composition similarly to Example 1, except that the quantity of epichlorohydrin-ethylene oxide copolymer rubber was set to 30 parts by mass and the quantity of chloroprene rubber was set to 70 parts by mass.

Example 9

In Example 9, a semiconductive rubber roller was manufactured by preparing a semiconductive rubber composition similarly to Example 1, except that the quantity of epichlorohydrin-ethylene oxide copolymer rubber was set to 70 parts by mass and the quantity of chloroprene rubber was set to 30 parts by mass.

Example 10

In Example 10, a semiconductive rubber roller was manufactured by preparing a semiconductive rubber composition similarly to Example 1, except that the epichlorohydrin-ethylene oxide copolymer rubber was replaced with 50 parts by mass of epichlorohydrin-ethylene oxide-allyl glycidyl ether copolymer rubber [GECO, Epion (registered trademark) 301 by Daiso Co., Ltd.].

Example 11

In Example 11, a semiconductive rubber roller was manufactured by preparing a semiconductive rubber composition similarly to Example 1, except that the quantity of chloroprene rubber was set to 25 parts by mass with addition of 25 parts by mass of NBR [acrylonitrile content: 31.5%, Nipol (registered trademark) DN223 by Nippon Zeon Co., Ltd.].

Comparative Example 7

In comparative example 7, a semiconductive rubber roller was manufactured by preparing a semiconductive rubber composition similarly to Example 1, except that 1.5 parts by mass of a thiazole-based vulcanization accelerator [di-2-benzothiazolyl disulfide, Nocceler DM by Ouchi Shinko Chemical Industrial], 0.5 parts by mass of a thiuram-based vulcanization accelerator [tetramethylthiuram monosulfide, Nocceler TS by Ouchi Shinko Chemical Industrial] and 1.5 parts by mass of sulfide (vulcanizer) with respect to 100 parts by mass of rubber contents in total were blended.

The characteristics of the semiconductive rubber composition and the semiconductive rubber roller prepared in each of Examples 1 to 11 and comparative examples 1 to 7 were evaluated through the following tests:

(Measurement of Type a Durometer Hardness)

The type A durometer hardness of the roller body of the semiconductive rubber roller manufactured in each of Examples 1 to 11 and comparative examples 1 to 7 was measured with a rubber hardness meter [Asker rubber hardness meter type A by Kobunshi Keiki Co., Ltd.] following the standards defined in JIS K6253:2006 "Rubber, vulcanized or thermoplastic-determination of hardness" at a temperature of 23±1° C. with relative humidity of 55±1%.

(Measurement of Compression Set)

A small test piece defined in JIS K6262: 2006 "Rubber, vulcanized or thermoplastic—determination of compression set at ambient, elevated or low temperatures" by vulcanizing the semiconductive rubber composition prepared in each of Examples 1 to 11 and comparative examples 1 to 7 under the same conditions as those for forming the semiconductive rubber roller. The compression set of the small test piece was measured by the method defined in the above at a temperature of 70±1° C. for 22 hours with compressibility of 25%.

(Photosensitive Drum Contamination Test)

A developing roller of a cartridge for a commercially available laser printer using a positively charged non-magnetic one-component toner was exchanged for the semiconductive rubber roller manufactured in each of Examples 1 to 11 and comparative examples 1 to 7, and the cartridge was left in a thermostat set to a temperature of 50° C. for five days and thereafter left in an environment of 22° C. in temperature and 55% in relative humidity for one day. Then, the cartridge was mounted on the laser printer for continuously forming images, and the formed images were observed for evaluating the presence or absence of contamination of a photosensitive drum with the following criteria:

X: Reduction of picture quality resulting from contamination of the photosensitive drum was observed from the first image as formed, and the problem was not solved even when 10 images were continuously formed.

Δ: While reduction of picture quality resulting from contamination of the photosensitive drum was observed from the first image as formed, the problem was solved after 10 images were continuously formed.

○: No reduction of picture quality resulting from contamination of the photosensitive drum was observed from the first image as formed.

(Unevenness of Imaging)

A developing roller of a cartridge for a commercially available laser printer using a positively charged non-magnetic one-component toner was exchanged for the semiconductive rubber roller manufactured in each of Examples 1 to 11 and comparative examples 1 to 7, and the cartridge was left in an environment of 22° C. in temperature and 55% in relative humidity for one day. Then, the cartridge was mounted on the laser printer for continuously forming images, and the formed images were observed for evaluating the presence or absence of unevenness of imaging with the following criteria:

X: Unevenness of imaging was observed from the first image as formed, and the problem was not solved even when 10 images were continuously formed.

Δ: While unevenness of imaging was observed from the first image as formed, the problem was solved after 10 images were continuously formed.

○: No unevenness of imaging was observed from the first image as formed.

Tables 1 and 2 show the results of the aforementioned tests.

TABLE 1

| | | Example 2 | Example 1 | Example 3 | Example 4 | Example 5 | Example 6 | Example 7 | Example 8 | Example 9 |
|---|---|---|---|---|---|---|---|---|---|---|
| Rubber Content | ECO | 50 | 50 | 50 | 50 | 50 | 50 | 50 | 30 | 70 |
| | GECO | — | — | — | — | — | — | — | — | — |
| | CR | 50 | 50 | 50 | 50 | 50 | 50 | 50 | 70 | 30 |
| | NBR | — | — | — | — | — | — | — | — | — |
| Vulcanization Accelerator | Thiourea-based | 0.5 | 1.0 | 1.5 | 1.0 | 1.0 | 1.0 | 1.0 | 1.0 | 1.0 |
| | Guanidine-based | 1.0 | 1.0 | 1.0 | 0.5 | 1.5 | 1.0 | 1.0 | 1.0 | 1.0 |
| | Thiazole-based | — | — | — | — | — | — | — | — | — |
| | Thiuram-based | — | — | — | — | — | — | — | — | — |
| Vulcanizer | Peroxide-based | 1.0 | 1.0 | 1.0 | 1.0 | 1.0 | 0.5 | 1.5 | 1.0 | 1.0 |
| | Sulfur | — | — | — | — | — | — | — | — | — |
| Evaluation | Type A hardness | A52 | A56 | A58 | A51 | A57 | A48 | A57 | A54 | A58 |
| | Compression Set (%) | 4.5 | 4.1 | 3.8 | 4.8 | 4.5 | 4.5 | 3.2 | 4.2 | 3.5 |
| | Contamination of photosensitive body | ○ | ○ | ○ | ○ | ○ | ○ | ○ | ○ | ○ |
| | Unevenness of imaging | ○ | ○ | ○ | ○ | ○ | ○ | ○ | ○ | ○ |

TABLE 2

| | | Example 10 | Example 11 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|
| Rubber Content | ECO | — | 50 | 50 | 50 | 50 | 50 | 50 | 50 | 50 |
| | GECO | 50 | — | — | — | — | — | — | — | — |
| | CR | 50 | 25 | 50 | 50 | 50 | 50 | 50 | 50 | 50 |
| | NBR | — | 25 | — | — | — | — | — | — | — |
| Vulcanization Accelerator | Thiourea-based | 1.0 | 1.0 | 0.4 | 1.6 | 1.0 | 1.0 | 1.0 | 1.0 | — |
| | Guanidine-based | 1.0 | 1.0 | 1.0 | 1.0 | 0.4 | 1.6 | 1.0 | 1.0 | — |
| | Thiazole-based | — | — | — | — | — | — | — | — | 1.5 |
| | Thiuram-based | — | — | — | — | — | — | — | — | 0.5 |
| Vulcanizer | Peroxide-based | 1.0 | 1.0 | 1.0 | 1.0 | 1.0 | 1.0 | 0.4 | 2.1 | — |
| | Sulfur | — | — | — | — | — | — | — | — | 1.5 |
| Evaluation | Type A hardness | A49 | A47 | A50 | A62 | A49 | A65 | A45 | A65 | A45 |
| | Compression set (%) | 4.6 | 4.3 | 6.5 | 3.7 | 6.5 | 4.3 | 6.3 | 3.0 | 11.5 |
| | Contamination of photosensitive body | ○ | ○ | Δ | Δ | Δ | X | Δ | X | X |
| | Unevenness of imaging | ○ | ○ | Δ | X | Δ | X | Δ | X | X |

From the results of Examples 1 to 11 and comparative example 7 shown in Tables 1 and 2, it has been recognized that a semiconductive rubber roller having small compression set in a state reduced in hardness and supplied with flexibility and hardly causing permanent set and unevenness of imaging following thereto can be manufactured by employing prescribed quantities of a thiourea-based vulcanization accelerator and a guanidine-based vulcanization accelerator as vulcanization accelerators while employing a prescribed quantity of a peroxide-based crosslinking agent as a vulcanizer in a system employing ethylene oxide-containing copolymer rubber and chloroprene rubber and/or NBR.

Further, it has been recognized that the quantity of the thiourea-based vulcanization accelerator must be not less than 0.5 parts by mass and not more than 1.5 parts by mass with respect to the sum of 100 parts by mass of the rubber content from the results of Examples 1 to 3 and comparative examples 1 and 2, that the quantity of the guanidine-based vulcanization accelerator must be not less than 0.5 parts by mass and not more than 1.5 parts by mass with respect to the sum of 100 parts by mass of the rubber content from the results of Examples 1, 4 and 5 and comparative examples 3 and 4, and that the quantity of the peroxide-based crosslinking agent must be not less than 0.5 parts by mass and not more than 2.0 parts by mass with respect to the sum of 100 parts by mass of the rubber content from the results of Examples 1, 6 and 7 and comparative examples 5 and 6.

In addition, it has been recognized that the ratio between the ethylene oxide-containing copolymer rubber and the chloroprene rubber is preferably 30/70 to 70/30 from the results of Examples 1, 8 and 9, that both of epichlorohydrin-ethylene oxide copolymer rubber and epichlorohydrin-ethylene oxide-allyl glycidyl ether copolymer rubber can be used as the ethylene oxide-containing copolymer rubber from the results of Examples 1 and 10, and that the hardness of the roller body can be further reduced by introducing NBR into the semiconductive rubber composition as the rubber content from the results of Examples 1 and 11.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2009-026324 filed with the Japan Patent Office on Feb. 6, 2009, the disclosure of which is incorporated herein by reference.

What is claimed is:

1. A semiconductive rubber composition containing:
   a rubber content containing at least copolymer rubber containing ethylene oxide as a copolymeric component and chloroprene rubber; and
   not less than 0.5 parts by mass and not more than 1.5 parts by mass of a thiourea-based vulcanization accelerator, not less than 0.5 parts by mass and not more than 1.5 parts by mass of a guanidine-based vulcanization accelerator and not less than 0.5 parts by mass and not more than 2.0 parts by mass of a peroxide-based crosslinking agent with respect to 100 parts by mass of the sum of the rubber content.

2. The semiconductive rubber composition according to claim 1, wherein
   the copolymer rubber is at least one type selected from the group consisting of epichlorohydrin-ethylene oxide copolymer rubber and epichlorohydrin-ethylene oxide-allyl glycidyl ether copolymer rubber.

3. The semiconductive rubber composition according to claim 1, wherein
   the rubber content also contains acrylonitrile-butadiene copolymer rubber.

4. A semiconductive rubber roller made of a semiconductive rubber composition containing:
   a rubber content containing at least copolymer rubber containing ethylene oxide as a copolymeric component and chloroprene rubber; and
   not less than 0.5 parts by mass and not more than 1.5 parts by mass of a thiourea-based vulcanization accelerator, not less than 0.5 parts by mass and not more than 1.5 parts by mass of a guanidine-based vulcanization accelerator and not less than 0.5 parts by mass and not more than 2.0 parts by mass of a peroxide-based crosslinking agent with respect to 100 parts by mass of the sum of the rubber content.

5. The semiconductive rubber roller according to claim 4, wherein
   the copolymer rubber is at least one type selected from the group consisting of epichlorohydrin-ethylene oxide copolymer rubber and epichlorohydrin-ethylene oxide-allyl glycidyl ether copolymer rubber.

6. The semiconductive rubber roller according to claim 4, wherein
   the rubber content also contains acrylonitrile-butadiene copolymer rubber.

* * * * *